(12) United States Patent
Schmeilin et al.

(10) Patent No.: US 12,093,571 B1
(45) Date of Patent: Sep. 17, 2024

(54) ACCELERATING REQUEST/RESPONSE PROTOCOLS

(71) Applicant: Amazon Technologies, Inc., Seattle, WA (US)

(72) Inventors: Evgeny Schmeilin, Haifa (IL); Leah Shalev, Zikhron Ya'Aqov (IL); Ghanim Fodi, Haifa (IL); Shay Agroskin, Haifa (IL); Gilad Broner, Kiryat Tiv'on (IL)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 17/937,167

(22) Filed: Sep. 30, 2022

(51) Int. Cl.
*G06F 3/06* (2006.01)

(52) U.S. Cl.
CPC ............ *G06F 3/0659* (2013.01); *G06F 3/061* (2013.01); *G06F 3/0668* (2013.01)

(58) Field of Classification Search
None
See application file for complete search history.

(56) References Cited

U.S. PATENT DOCUMENTS

| | | | | |
|---|---|---|---|---|
| 9,276,993 B2 * | 3/2016 | Keels | ...................... | H04L 69/12 |
| 2007/0208820 A1 * | 9/2007 | Makhervaks | ........... | H04L 67/10 |
| | | | | 709/212 |
| 2010/0146068 A1 * | 6/2010 | Haviv | ................... | G06F 3/0635 |
| | | | | 709/212 |
| 2021/0397373 A1 * | 12/2021 | Muthiah | ................. | G06F 9/485 |
| 2022/0166698 A1 * | 5/2022 | Lee | ..................... | H04L 43/0882 |

OTHER PUBLICATIONS

Thomson, M., et al., "Using TLS to Secure QUIC," May 2021, pp. 1-65, URL: https://www.rfc-editor.org/rfc/rfc9001.txt.

* cited by examiner

*Primary Examiner* — Michael Sun
(74) *Attorney, Agent, or Firm* — Weaver Austin Villeneuve & Sampson LLP

(57) ABSTRACT

A network device can be used on a client side and a server side to accelerate request/response protocols for object transfers between the client side and the server side. The network device can interface with an application executing on the host device, which can allow the network device to expose different operations that can enable acceleration of different higher level object transfer commands. The network device can expose operations to pre-post anonymous receive buffers and client buffers even before the server side responds to the object transfer commands, which can allow the client buffers to be available to the server early on. Small transfers can be performed without remote direct memory access (RDMA) and can be received in the anonymous receive buffers at the server side. Bulk object data can be sent via RDMA for direct data placement into the client buffers to enable zero copy.

21 Claims, 9 Drawing Sheets

ACCELERATING REQUEST/RESPONSE PROTOCOLS

BACKGROUND

Transferring objects (e.g., files) over a network generally uses request/response command protocols such as Hypertext Transfer Protocol (HTTP) or HTTP Secure (HTTPS). HTTP/HTTPS protocol is an application layer protocol that may rely on TCP/IP/TLS stack for object transfer by exchanging request and response messages. A client can request to retrieve an object from a server using an HTTP GET command, or the client can request to send an object to the server using an HTTP PUT command, and the server can respond to the request based on the command.

BRIEF DESCRIPTION OF THE DRAWINGS

Various embodiments in accordance with the present disclosure will be described with reference to the drawings, in which.

DETAILED DESCRIPTION

Figure 1:
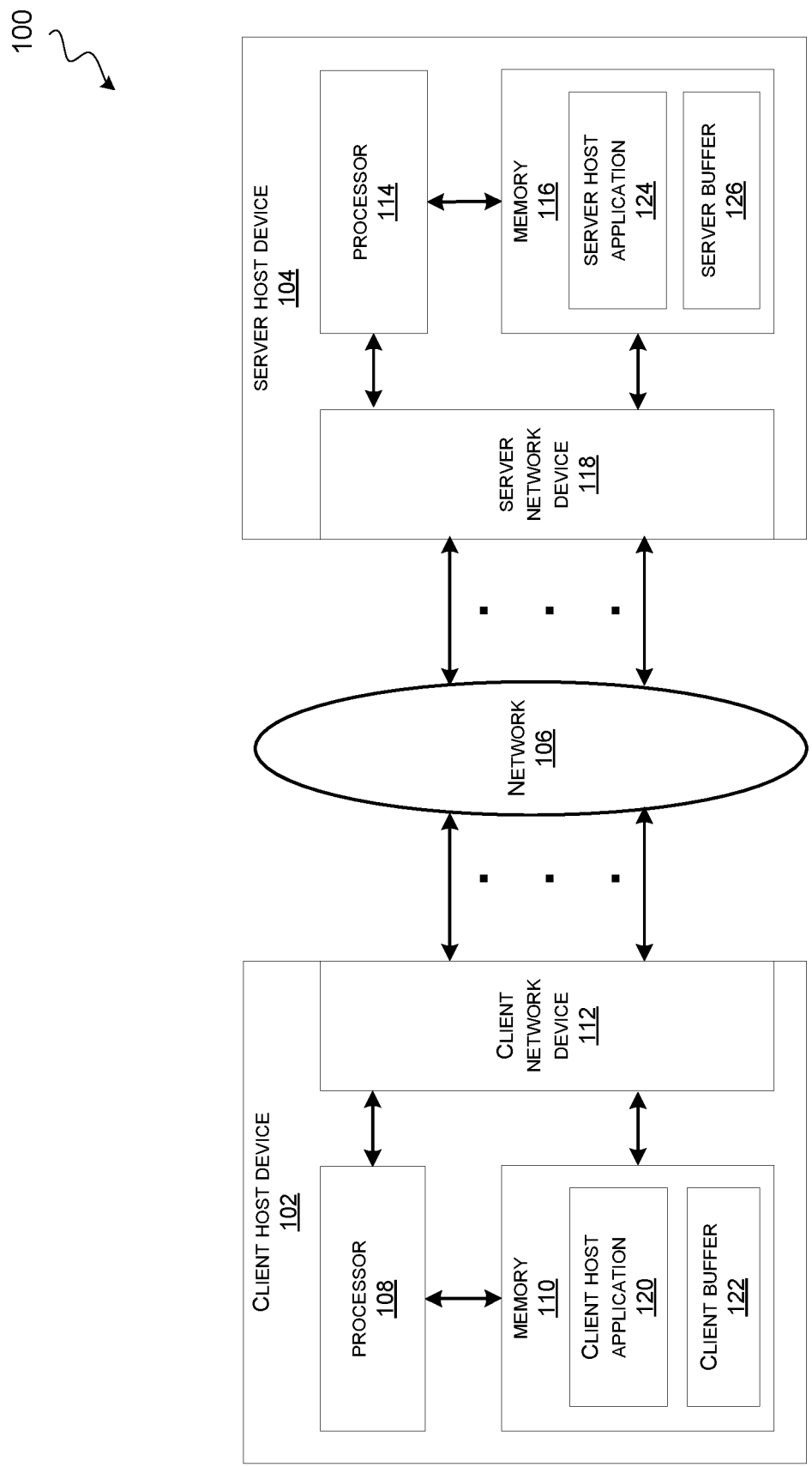
FIG. 1 illustrates a system that can be configured to accelerate object transfer operations over a network based on request/response command protocols, in accordance with some embodiments.

Request/response protocols (e.g., HTTP, HTTPS) are command-based protocols that allow object transfers to be performed between two network nodes. An object can be one or more files, documents, images, videos, text, or another type of data. HTTP/HTTPS protocol is an application layer protocol that generally relies on TCP/IP/TLS stack for object transfers by exchanging request and response messages. In most cases, a client (e.g., initiator, requester) submits an object GET/PUT command and a server (e.g., completer or responder) responds to the object GET/PUT command.

Transmission Control Protocol (TCP) can provide application-to-application connectivity at the transport layer of the protocol stack, and together with Internet Protocol (IP) can form an IP suite for communication over a network. Transport Layer Security (TLS) can add a security layer on top of the TCP/IP transport protocol. However, TCP/IP/TLS protocol is known to be a major source of CPU overheard for network intensive applications due to interrupts, context switches, memory copies, kernel locks, socket buffer allocations, etc., even after extensive performance tuning. Most systems may get bottlenecked on CPU and/or memory bandwidth, and additional application-level processing can decrease the achievable throughput. In most cases, TCP/IP/TLS protocol generally has major drawbacks at the end point as well as sub-optimal end-to-end behavior mainly due to single network path each connection uses. These drawbacks can limit the traffic bandwidth, and may create high latency jitter.

In some cases, TCP overhead can be decreased using optimized TCP implementation running on dedicated cores (known as transport onload). However, this approach is generally feasible on large instances that need consistently high network throughput, and cannot be used on small instances, or in cases when the bandwidth requirements are not known upfront and can change dynamically. Another possible approach relies on TCP offload to network cards, which has not been successful mainly due to semantic gap between synchronous sockets API based on data copying from internal buffers, and inherently asynchronous behavior of the TCP offload devices, and also due to undifferentiated stream semantics (which may also prevent acceleration for application data processing such as zero copy receive, encryption, or compression). Thus, TCP offload does not reduce the work or number of copies (as zero copy is precluded by synchronous semantics, lacking knowledge about intended future data transfer).

Thus, there is a need for a more efficient implementation of request/response protocols, such as HTTP/HTTPS, without relying on TCP/IP. Replacing TCP/IP can address local CPU efficiency issues by enabling utilization of very high bandwidth, and can also address TCP end-to-end behavior issues in a well-defined cloud infrastructure where TCP performance can be highly unpredictable due to each TCP connection using a single network path, which can cause significant delays (e.g., in the order of seconds or minutes) when hitting overloaded or faulty hardware. Furthermore, additional overhead can stem from TLS, which cannot be avoided due to the requirement for transient encryption. In some cases, TLS offload can be performed in software with some limitations.

The techniques described herein can be used to accelerate request/response protocols, such as HTTP/HTTPS, by exposing a unified interface to the applications that abstracts away the network stack details. The unified interface can be provided using a network device on both the client side and the server side. In various embodiments, the network device can interface with a host application (e.g., a host driver or software development kit (SDK)), which can allow the network device to expose different operations that can enable acceleration of different higher level object transfer commands. The network device can expose object transfer semantic that can enable object GET/PUT commands, running within a command slot, which represents a channel that can be used to pre-allocate needed resources and manage per-packet data acceleration configuration like in-device encryption or compression.

The embodiments can allow a client to submit object transfer commands to the command slot. For example, the object transfer commands may include Object GET or PUT commands comprising a data transfer request with metadata. The network device can pre-post anonymous receive buffers for receiving the object metadata packets. The object metadata packets can be delivered as regular network packets (e.g., non-RDMA) into anonymous buffers on the server side to minimize transfer latency. The bulk object data can be transmitted via remote direct memory access (RDMA) to allow zero-copy operation bypassing network stack and avoiding host kernel to user copy. The network device can also pre-post RDMA buffers associated with the command slot for receiving the bulk object data. Since the object transfer semantic is available at a higher level than the network device (e.g., HTTP/HTTPS layer in middleware), the middleware is aware when it expects to receive the object data. This can allow pre-posting the RDMA buffers when needed and before the server starts to send the bulk data in response to the GET command. In various embodiments, object transfers between the client side and the server side can be performed using abstract commands and without exposing the client memory addresses to the server host application, which can allow optimizations for non-RDMA data transfers using shorter object GET commands.

The network device can further accelerate the object transfer commands based on request/response protocols by utilizing Scalable Reliable Datagram (SRD) transport protocol to overcome TCP shortcomings. The SRD transport protocol (sometimes referred to as Relaxed Reliable Datagram (RRD) protocol) can address both end-to-end behavior concerns (by utilizing multiple network paths with very short recovery times), and end-node efficiency concerns (by allowing direct data placement (DDP) and inline data processing acceleration). The SRD transport protocol can also support encryption in hardware, and RDMA capabilities for the bulk object transfers.

The SRD transport protocol may enable the use of multiple paths to send packets of the same user flow in parallel over the network. Using multiple paths in parallel can enable the spreading of packets of a given flow onto different paths to reduce overall latency and improve reliability. Thus, if problems are seen (e.g., congestion on a particular path), paths can be quickly switched, and the packets may be retransmitted over a different path. Recovery from failed network equipment can happen quickly and does not depend on routing changes.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a system 100 that can be configured to accelerate object transfer operations over a network based on request/response command protocols, in accordance with some embodiments.

The system 100 may include a client host device 102 configured to communicate with a server host device 104 over a network 106. The client host device 102 and the server host device 104 can be a server, a computer system, or any network connected device. In some examples, the client host device 102 and the server host device 104 can be nodes in a cloud network (or a virtual private cloud) comprising a plurality of such nodes. As an example, the system 100 may be configured to support applications such as web hosting, high-performance computing (HPC), cloud computing, database hosting, among others.

The client host device 102 may include a processor 108 coupled to memory 110 and a client network device 112. The processor 108 may be configured to execute instructions to perform certain operations. For example, the instructions may be stored in the memory 110. The memory 110 may also include a client buffer 122, which may be configured to store object data received from the sever host device 104, or the object data to be sent to the server host device 104. The client buffer 122 can be mapped in the user address space. In some examples, the processor 108 may be configured to execute a client host application 120 that is stored in the memory 110. The client host application 120 may correspond to a host driver, SDK, or another software interface. The client network device 112 may be configured to support acceleration of object transfer commands to perform the object transfers with the server host device 104 over the network 106.

The server host device 104 may include a processor 114 coupled to memory 116 and a server network device 118. The processor 114 may be configured to execute instructions to perform certain operations. For example, the instructions may be stored in the memory 116. The memory 116 may also include a server buffer 126, which may be configured to store object data for the object transfer operations. In some implementations, the server buffer 126 may be mapped to the system memory of the server host device 104. In some examples, the processor 114 may be configured to execute a server host application 124 that is stored in the memory 116. The server host application 124 may correspond to a host driver, SDK, or another software interface. The server network device 118 may be configured to support acceleration of object transfer commands to perform the object transfers with the client host device 102 over the network 106.

In some embodiments, the client network device 112 and the server network device 118 may establish SRD connections to perform the object transfers, which can enable the use of multiple paths in parallel over the network, and reduce overall latency and improve reliability as compared to TCP/IP protocol. The SRD connection can also provide RDMA capabilities for bulk data transfers associated with certain higher level object transfer commands.

In various embodiments, the object transfer between the client host device 102 and the server host device 104 can be accelerated using the client network device 112 and the server network device 118 that can support certain low level device primitive operations. These primitives can be composed in different ways to enable acceleration of different higher level object transfer commands associated with an application protocol, such as object GET/PUT commands for HTTP/HTTPS. Each of the client network device 112 and the server network device 118 may include a plurality of queues to enable the transmit and receive communication with the respective host device. The plurality of queues may include a submission queue (SQ), a receive buffer queue (RQ), and a completion/notification queue (CQ).

In various embodiments, the client host application 120 and the server host application 124 may be aware of certain device primitive operations that can be performed by the client network device 112 and the server network device 118 to accelerate the object transfer. The client host application 120 and the server host application 124 may send corresponding commands or messages to the client network device 112 and the server network device 118 to enable the execution of these device primitive operations, which can accelerate the object transfer based on the object transfer commands.

In some embodiments, having exposure to low level device primitive operations can enable the client host application 120 to provide address information for the client buffer 122 to perform object transfers using non-RDMA writes, or for direct data placement (DDP) of the object data retrieved from the server host device 104 using RDMA writes, even before the server host application 124 receives the request for object transfer. Thus, in some cases, the object transfer can be accelerated by performing DDP of the object data into the client buffer to enable zero copy bypassing the OS kernel in the network stack. This is further explained with reference to FIG. 2.

Figure 2:
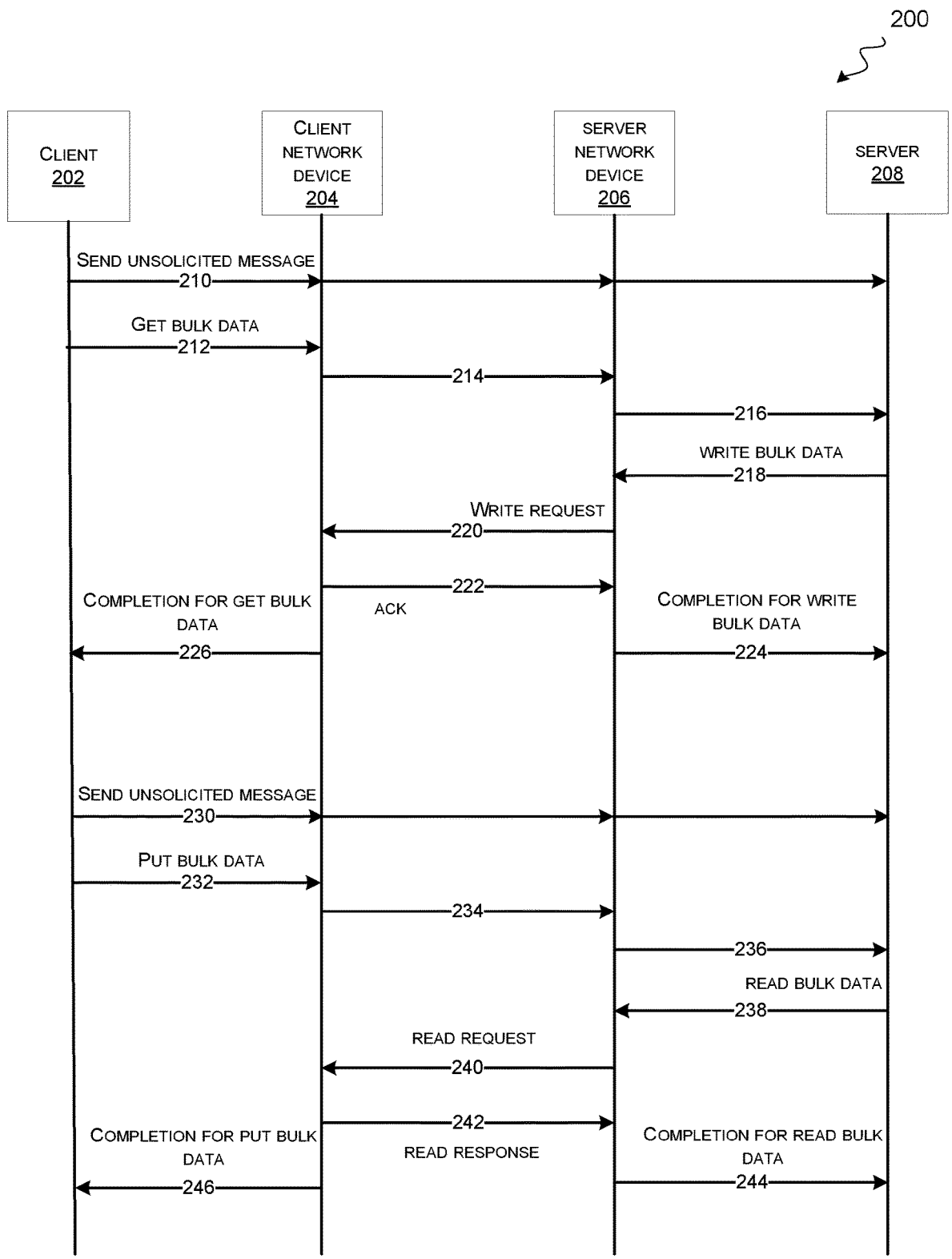
FIG. 2 illustrates a high-level flow diagram for performing object transfers between a client and a server, in accordance with some embodiments.

FIG. 2 illustrates a high-level flow diagram 200 for performing object transfers between a client and a server, in accordance with some embodiments.

In some examples, a client 202 can initiate object transfers with a remote server 208 based on an application protocol. For example, the client 202 can initiate object GET or PUT commands based on the HTTP/HTTPS protocol to retrieve object data from memory associated with the server 208 or write object data in memory associated with the server 208, respectively, via a network. The client 202 may be communicatively coupled to a client network device 204, and the server 208 may be communicatively coupled to a server network device 206. As an example, the client network device 204 can be the client network device 112, the server network device 206 can be the server network device 118, the client 202 can include the client host device 102 and/or the client host application 120, and the server 208 can include the server host device 104 and/or the server host application 124. The client network device 204 and the server network device 206 may be configured to communicate via the network 106 based on any suitable transport protocol, such as the SRD transport protocol.

As shown in FIG. 2, the client 202 can initiate an object transfer by sending an unsolicited message 210 (a message initiated by the client 202). The unsolicited message 210 may correspond to the object GET command for the HTTP/HTTPS protocol, and may include the relevant metadata (e.g., HTTP/HTTPS headers, object identification, etc.). The unsolicited message 210 can be forwarded to the server 208 via the client network device 204 and the server network device 206 over a network connection.

The client 202 can then send a request to perform the object transfer using a get bulk data message 212. The get bulk data message 212 may include client buffer information for placing the object data into the client buffer 122, and a sequence identifier (ID) associated with this request. The client buffer 122 may be mapped to a user virtual address. The client buffer information may include an address associated with placement of the object data into the client buffer 122. In some examples, the get bulk data message 212 may also include an object offset that corresponds to a requested data range indicating a portion of the object data that is currently requested from the server 208. For example, the object data may be stored in the server buffer 126. The client network device 204 may allocate a tag which can be used for the DDP of the object data to be transferred from the server buffer 126 using RDMA write operations for zero-copy. The client network device 204 may send the information for the get bulk data message 212 and the tag as a network packet 214 to the server network device 206 using any suitable transport protocol (e.g., SRD transport protocol). The server network device 204 may generate a client request ID, and associate the client request ID with the client buffer information to prevent exposing the client buffer information to the server host application 124. The client request ID can be any opaque identifier associated with the client buffer 122, which can be used by the server host application 124 for facilitating the transfer of the object data from the server buffer 126 to the client buffer 122. The server network device 206 may forward the sequence ID, the object offset, and the client request ID to the server 208 as a message 216, and use the tag for the RDMA operations.

The server 208 may respond to the message 216 by sending a write bulk data message 218. The write bulk data message 218 may include the sequence ID, local memory mapped addresses (SGL) associated with the server buffer 126, chunk size, a client buffer ID identifying the client buffer 122, and a buffer offset for placing this portion of the object data into the client buffer 122. The server 208 may send multiple write bulk data messages based on the total size of the object data requested in the get bulk data message 212, and each write bulk data message may include a corresponding buffer offset for placing that portion of that object data into the client buffer 122.

The server network device 206 may perform one or more RDMA write operations 220 to provide different portions of the object data for placing into the client buffer 122 based on the corresponding buffer offset. The client network device 204 may send one or more RDMA acknowledgement (ack) messages 222 corresponding to the one or more RDMA write operations 220 to the server network device 206. Upon receiving the RDMA ack messages 222, the server network device 206 may send a completion message 224 to the server 208 for the write bulk data message 218. Once the requested object data for the given sequence ID has been placed into the client buffer 122, the client network device 204 may send a completion message 226 to the client 202 for the get bulk data message 212 indicating that the object data is ready to be consumed. In some examples, the size of the object data requested in the object GET command may be small, and, therefore, a non-RDMA write operation can be performed to write the object data into the client buffer 122. This object GET command is discussed in detail with reference to FIG. 3.

As shown in FIG. 2, in some instances, the client 202 may initiate an object transfer by sending an unsolicited message 230. The unsolicited message 230 may correspond to the object PUT command for the HTTP/HTTPS protocol, and may include the relevant metadata (e.g., HTTP/HTTPS headers, object identification, etc.). The unsolicited message 230 can be forwarded to the server 208 via the client network device 204 and the server network device 206 over the network connection. Note that FIG. 2 describes the object transfers using the object GET command followed by the object PUT command for ease of discussion only, and the embodiments can support executing the object transfer commands in any order within the scope of the disclosure.

The client 202 can then send a request to perform the object transfer using a put bulk data message 232. The put bulk data message 232 may include client buffer information for reading the object data from the client buffer 122, and a sequence ID associated with this request. The client buffer information may include any information associated with the location of the object data stored in the client buffer 122. In some embodiments, the location information may include an address associated with the client buffer 122. In some examples, the put bulk data message 232 may also include a size of the object data that is currently requested to be sent to the server 208. The client network device 204 may send the information for the put bulk data message 232 and the size of the object data as a network packet 234 to the server network device 206 over the network. The server network device 204 may generate a client request ID based on the client buffer information to prevent exposing the client buffer information to the server host application 124. The client request ID can be any opaque identifier which can be used by the server host application 124 for facilitating the object transfer with the client 202. The server network device 206 may forward the sequence ID, the size of the object, and the client request ID to the server 208 as a message 236.

The server 208 may respond to the put bulk data message 232 by sending a read bulk data message 238. The read bulk data message 238 may include the sequence ID, size of a portion of the object data being read, and a buffer offset for reading this portion of the object data from the client buffer 122. The server 208 may send multiple read bulk data messages based on the total size of the object data requested to be read in the put bulk data message 232, and each read bulk data message may include a corresponding buffer offset for reading that portion of that object data from the client buffer 122.

The server network device 206 may allocate a tag which can be used for the DDP of the object data to be transferred from the client buffer 122 using RDMA read operations. The server network device 206 may send an RDMA read request 240 over the network 106 to the client network device 204 to perform the RDMA reads from the client buffer 122 using the tag. The client network device 204 may provide an RDMA read response 242 for the DDP of the object data read from the client buffer 122 into the server buffer 126. Upon receiving the object data in response to the RDMA read request 240, the server network device 206 may send a completion message 244 to the server 208 for the read bulk data message 238. Once the requested object data for the given sequence ID has been placed into the server buffer 126, the client network device 204 may send a completion message 246 to the client 202 for the put bulk data message 232 indicating that the object data has been transferred to the server buffer 126. In some examples, the size of the object data used in the object PUT command may be small, and, therefore, a non-RDMA read operation can be performed to read the object data from the client buffer 122. This object PUT command is discussed in detail with reference to FIG. 4.

Figure 3:
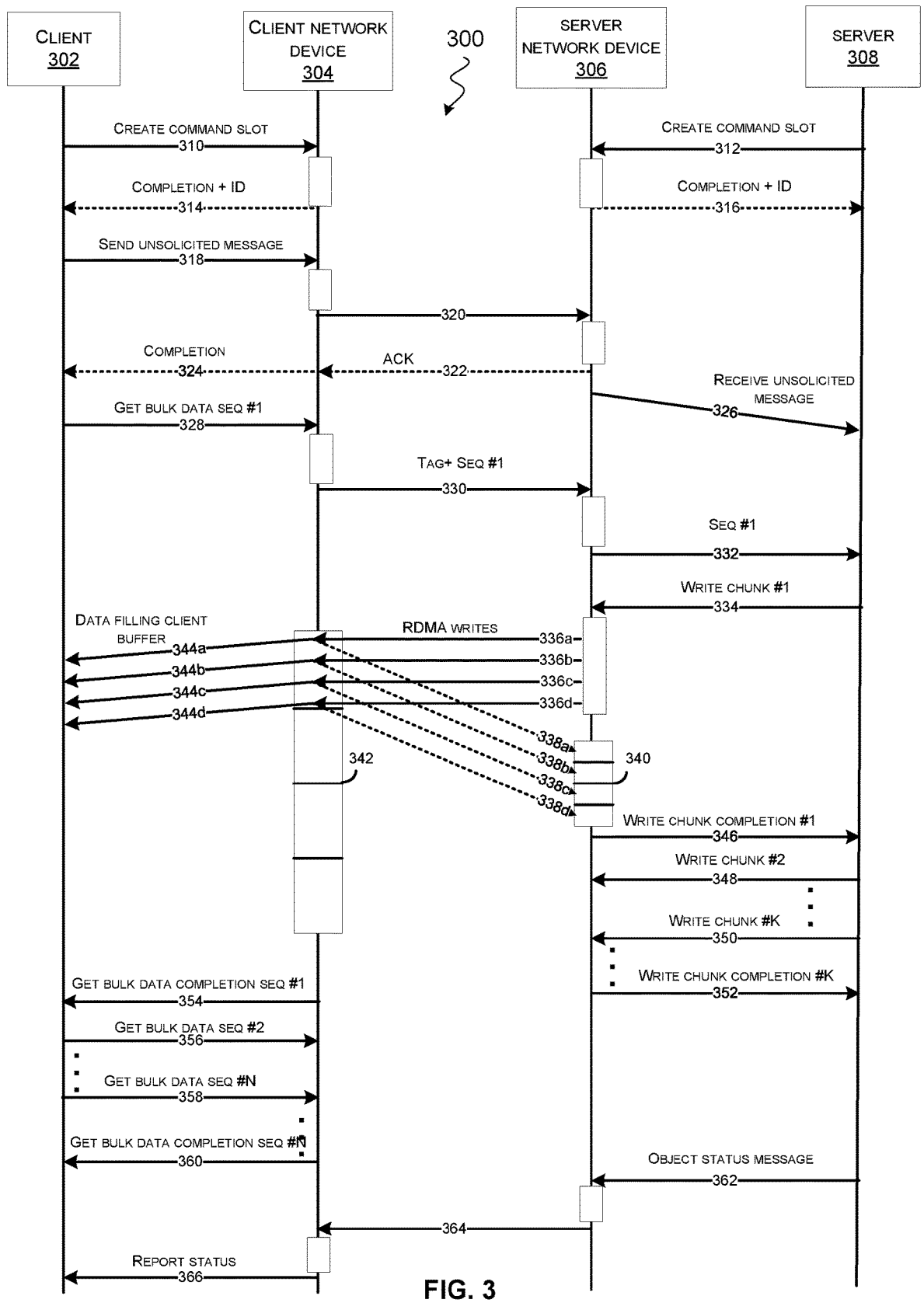
FIG. 3 illustrates an example flow diagram for performing an object transfer to get object data from a server, in accordance with some embodiments.

FIG. 3 illustrates an example flow diagram 300 for performing an object transfer to get object data from a server, in accordance with some embodiments.

In some examples, a client 302 can initiate object transfer to transfer object data from a remote server 308 based on an application protocol command. The client 302 may be communicatively coupled to a client network device 304 and the server 308 may be communicatively coupled to a server network device 306. In some examples, the application protocol command may include an object GET command based on the HTTP/HTTPS protocol. The client network device 304 can be the client network device 112, the server network device 306 can be the server network device 118, the client 302 can include the client host device 102 and/or the client host application 120, and the server 308 can include the server host device 104 and/or the server host application 124.

In some embodiments, before starting the object transfer, the client 302 and the server 308 may send a request to the client network device 304 and the server network device 306, respectively, to create and configure a command slot using create command slot messages 310, 312. The command slot message 310 may be received via an SQ in the client network device 304, and the command slot message 312 may be received via an SQ in the server network device 306. The command slot can be used to provide a channel to pre-allocate resources, and manage various configurations, thresholds, statuses, and resource usage for all the device primitive operations associated with the object GET command. Configuring the command slot may include selecting the type of encryption used for encrypting the packets for transmitting over the network 106 or any other cryptographic operations on the object data, and establishing a network connection between the client network device 304 and the server network device 306 based on any suitable transport protocol (e.g., SRD transport protocol) for executing the object transfer between the client 302 and the server 308. The command slot may be used by the client 302 and the server 308 to submit all the device operations that need to be handled by the client network device 304 and the server network device 308, respectively, associated with the command.

The client network device 304 may send a completion message 314 to the client 302, and the server network device 306 may send a completion message 316 to the server 308 upon completing the creation/configuration of the command slot. In some examples, the client 302 and the server 308 may execute multiple commands in parallel, and, therefore, each command slot can be associated with a command slot identifier (ID). In some embodiments, the client network device 304 and the server network device 306 may create a command slot by allocating a specific command slot ID to the command slot, and provide the command slot ID in the completion messages 314, 316 to the client 302 and the server 308, respectively, which can be used by client 302 and the server 308 to submit all the future device operations associated with that command. The completion message 314 may be sent via a CQ in the client network device 304, and the completion message 316 may be sent via a CQ in the server network device 306.

The client 302 may initiate an object transfer from the server 308 by sending an unsolicited message 318. The unsolicited message 318 may correspond to the object GET command for the HTTP/HTTPS protocol. The unsolicited message 318 may be received by the client network device 304 via the SQ. The unsolicited message 318 may provide the protocol specific metadata for the object GET command (e.g., HTTP/HTTPS headers, object identification, etc.) via a descriptor. The unsolicited message 318 may also be used to pre-post the anonymous receive (RX) buffers in the RQ in the server network device 306 for receiving this metadata.

The client network device 304 may send a network packet 320 to the server network device 306 over the network 106 based on the unsolicited message 318. The network packet 320 may be compressed, encrypted, and signed according to the command slot configuration. The server network device 306 may send contents of the unsolicited message command 318 to the server 308 via a message 326, which may be received by the one or more RX buffers pre-posted in the RQ in the server network device 306. The server network device 306 may send an ack packet 322 to the client network device 304 in response to the network packet 320. The client network device 304 can, in turn, send a completion message 324 back to the client 302 indicating that the unsolicited message 318 has been transferred to the server 308.

The client 302 can request to get bulk object data from a certain offset from the server buffer 126. In some embodiments, one or more get bulk data messages can be used to transfer the bulk data from the server 308 into the client buffer 122. Each get bulk data message can be sequenced with a sequence ID and can be used to get a chunk or portion of the object data from the server 308. Each get bulk data message may include a get bulk data descriptor comprising the client buffer information, sequence ID, command slot ID, bulk data size, object offset, and any other relevant information. The client buffer information may include information associated with the placement of the object data into the client buffer 122, e.g., an address associated with the client buffer 122. The get bulk data message may indicate to the server 308 that the client 302 is ready to receive bulk data from the given object offset and size. The get bulk data message may advertise the client buffer 122 to the server network device 306 without exposing the client buffer addresses to the server 308, which can be used by the server 308 to respond with several write bulk data posts to fill the client buffer 122 with the RDMA operations. In some embodiments, the client buffer information may be advertised to the server network device 306 in the unsolicited message 318 instead of the get bulk data message to perform object transfers using non-RDMA writes.

As shown in FIG. 3, the client 302 may send a request to get a first chunk of the object data from the server 308 using a get bulk data message 328 having a sequence ID as 1. In some embodiments, the request from the client 302 may include client buffer information which can be used to fill the client buffer 122 with the portion of the object data read from the server 308 using RDMA operations. For example, the client buffer information may include an address associated with the client buffer 122 where the portion of the object data can be written into. In some implementations, the client buffer information may include SGL with physical address segments, which can be provided via the descriptor for each of the get bulk data messages.

The client network device 304 may receive the request to start the object transfer based on the get bulk data message 328 received from the client 302 via the SQ 506. The client network device 304 may configure the DDP for the object transfer by allocating a tag for the object transfer request, which can be used by the server network device 306 for the RDMA operations. The client network device 304 may also initialize a client buffer scoreboard 342, which can be used to accumulate completions of RDMA writes since the RDMA writes may arrive in out-of-order (e.g., due to network delay or latency). The client network device 304 may send the get bulk data descriptor for the get bulk data message 328 along with the allocated tag to the server network device 306 as a network packet 330 over the network 106. The server network device 306 may generate a client request ID based on the client buffer information. The server network device 306 may forward the sequence ID, object offset, command slot ID, bulk data size, and the client request ID to the server 308 in a message 332 without sending the tag. The server network device 306 may use the tag for the RDMA write operations.

In some embodiments, when the server 308 receives the request to send the bulk data (e.g., a portion of the object data) along with the client request ID and the sequence ID, the server 308 can send a plurality of write chunks corresponding to the portion of the object data to the server network device 306 using a plurality of write bulk data messages. Each write bulk data message may include a respective descriptor comprising the chunk size, local memory mapped addresses (SGL), a client buffer ID, and an offset for placing the given write chunk into the client buffer 122. For example, the client buffer 122 can be of 128 KB in size, and each write chunk can be 32 KB in size. As shown in FIG. 3, the server 308 may send a first write chunk using a write bulk data message 334 to the server network device 306 for placing the first write chunk into the client buffer 122 at a first offset using the given descriptor.

The server network device 306 may split each write chunk into multiple packets for transmitting via a plurality of RDMA writes 336a, 336b, 336c, 336d according to a maximum transmission unit (MTU) supported by the network 106. As an example, the server network device 306 may split each 32 KB write chunk into 4 packets of size 8 KB each. The client network device 304 may receive multi-packet RDMA writes 336a-336d, and send a respective RDMA write ack to the server network device 306 in response to each RDMA write. The server network device 306 may also initialize a server chunk RDMA acks scoreboard 340 that can be used to accumulate acks 338a, 338b, 338c, 338d received in response to the multi-packet RDMA writes 336a-336d. The client network device 304 may start filling the client buffer 122 using the tag with each RDMA write as shown by commands 344a, 344b, 344c, 344d. Since the client buffer 122 may be bigger in size than the size of each write chunk, only portion of the client buffer 122 may be filled at a time. Thus, pre-posting the information about the client buffer 122 even before the original request with the get bulk data message is received by the server 308 can allow the server 308 to perform the RDMA writes without waiting for the client buffer 122 to become fully available.

When the scoreboard 340 is filled indicating that all the packets corresponding to the first write chunk has been received by the client network device 304, the server network device 306 may send a corresponding first write chunk completion message 346 to the server 308 via the CQ. When the server 308 receives a write chunk completion message for a write chunk, it can free up and recycle the resources associated with that write chunk. The server 308 may send multiple such write chunks in parallel to the server network device 306, which may further transmit these write chunks to the client network device 306 over the network 106 via RDMA writes for filling the client buffer 122. For example, as shown in FIG. 3, the server may send a second write chunk using a write bulk data message 348, and a $K^{th}$ write chunk using a write bulk data message 350 to the server network device 306. The server network device 306 may send a $K^{th}$ write chunk completion message 352 to the server 308 via the CQ.

Once the client buffer scoreboard 342 is full indicating that the client buffer 122 has been written with the portion of the object data, the client network device 304 may send a completion message 354 including the first sequence ID to the client 302 indicating that the get bulk data message 328 for the first sequence ID has been processed. Thus, the embodiments can accelerate object transfers using zero copy that can allow writing the object data directly into the user space buffer bypassing the OS kernel in the network stack.

In some cases, the object size can be bigger than the size of the client buffer 122. In such cases, multiple get bulk data messages can be sent in parallel or over time to the server 308. Each bulk data message can include a respective sequence ID, which can be included in the respective completion message received from the client network device 304 as each bulk data message is completed. As shown in FIG. 3, the client 302 can send a request to transfer a second portion of the object data using a get bulk data message 356 with a second sequence ID, and a request to transfer an Nt portion of the object data using a get bulk data message 358 with an $N^{th}$ sequence ID. The client network device 304 may send a completion message 360 with the $N^{th}$ sequence ID corresponding to the get bulk data message 358.

Once the server 308 is done sending the object data to the server network device 306, the sever 308 may send an object status message 362 to the server network device 306 comprising the consumed size. The server network device 308 may forward the object status message with the total object size to the client network device 304 as a network packet 364 over the network 106. In some cases, the client network device 304 may determine that the client buffer 122 is partially filled and may flush the partially filled client buffer 122 to a memory associated with the client 302 based on the total object size consumed, and report the status and the total object size in a message 366 to the client 302.

Figure 4:
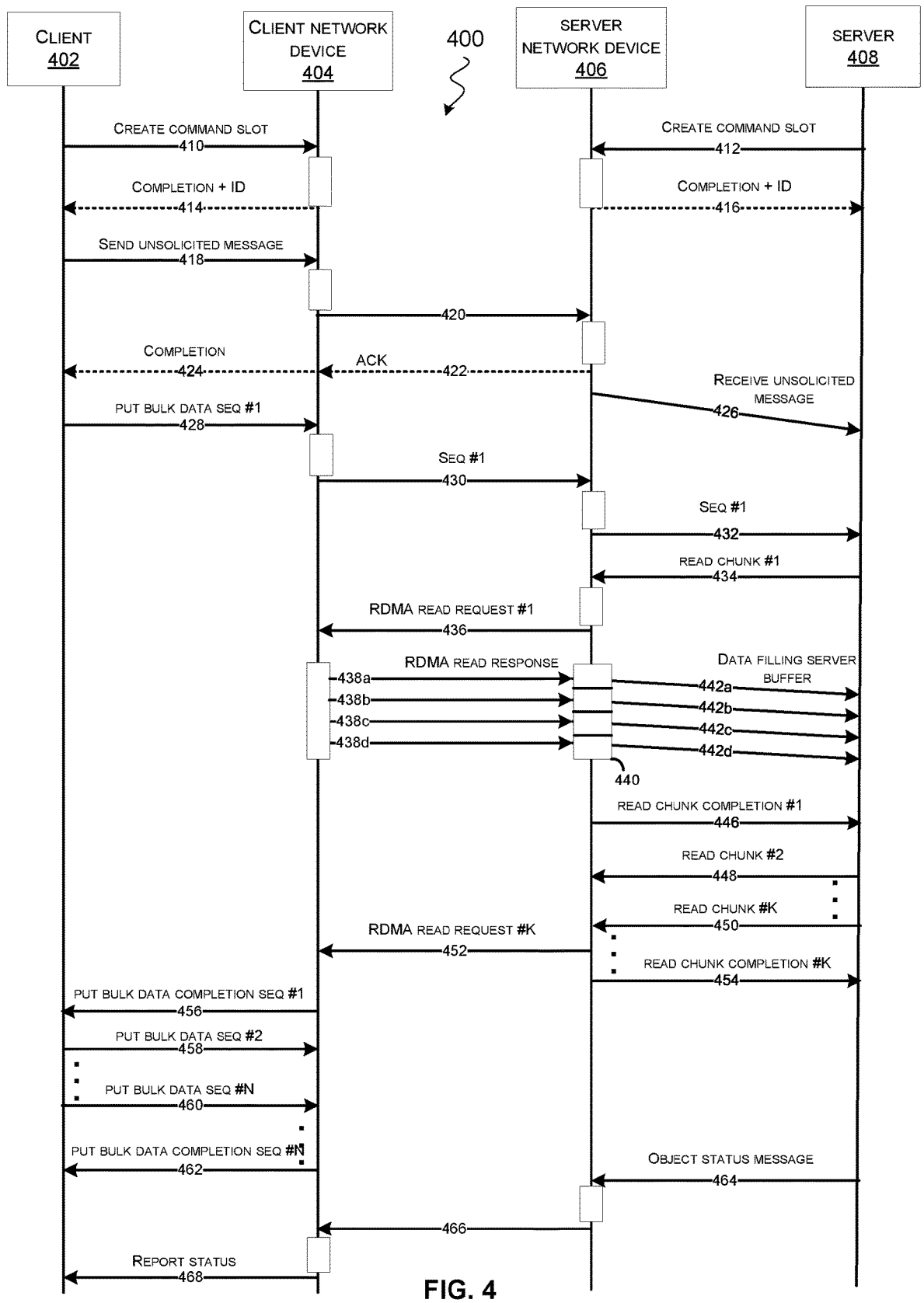
FIG. 4 illustrates an example flow diagram for performing an object transfer to send object data to a server, in accordance with some embodiments.

FIG. 4 illustrates an example flow diagram 400 for performing an object transfer to send object data to a server, in accordance with some embodiments.

In some examples, a client 402 can initiate object transfer to transfer object data to a remote server 408 based on an application protocol command. The client 402 may be communicatively coupled to a client network device 404 and the server 408 may be communicatively coupled to a server network device 406. In some examples, the application protocol command may include an object PUT command based on the HTTP/HTTPS protocol.

The client 402, the client network device 404, the server network device 406, and the server 408 can be same as the client 302, the client network device 304, the server network device 306, and the server 308, respectively, in FIG. 3.

As discussed with reference to FIG. 3, before starting the object transfer, the client 402 and the server 408 may send a request to the client network device 404 and the server network device 406 to create and configure a command slot using create command slot messages 410, 412, respectively, that are similar to the create command slot messages 310, 312. Upon completing the creation/configuration of the command slot, the client network device 404 may send a completion message 414 to the client 402 similar to the completion message 314, and the server network device 406 may send a completion message 416 to the server 408 similar to the completion message 316. The command slot may be used by the client 402 and the server 408 to submit all the device operations that need to be handled by the client network device 404 and the server network device 408, respectively, associated with the command.

The client 202 may initiate an object transfer to the server 408 by sending an unsolicited message 418. The unsolicited message 418 may correspond to the object PUT command for the HTTP/HTTPS protocol. The unsolicited message 418 may be received by the client network device 404 via the SQ. The unsolicited message 418 may provide the protocol specific metadata for the object PUT command (e.g., HTTP/HTTPS headers, object identification, etc.) via a descriptor. The unsolicited message 418 may also be used to pre-post the anonymous RX buffers in the RQ in the server network device 406 for receiving this metadata.

The client network device 404 may send a network packet 420 to the server network device 406 over the network 106 based on the unsolicited message. The network packet 420 may be compressed, encrypted, and signed according to the command slot configuration. The server network device 406 may send contents of the unsolicited message command 418 to the server 408 via a message 426, which may be received by the one or more RX buffers pre-posted in the RQ in the server network device 406. The server network device 406 may send an ack packet 422 to the client network device 404 in response to the network packet 420. The client network device 404 can, in turn, send a completion message 424 back to the client 402 indicating that the unsolicited message 418 has been transferred to the server 408.

The client 402 can request to transfer bulk object data from a certain offset in the client buffer 122 to the server buffer 126. In some embodiments, one or more put bulk data messages can be used to transfer the bulk data from the client buffer 122 to the sever buffer 126. Each put bulk data message can be sequenced with a sequence ID and can be used to send a chunk or portion of the object data to the server 308. Each put bulk data message may include a put bulk data descriptor comprising the client buffer information, sequence ID, command slot ID, bulk data size, and any other relevant information. The client buffer information may include information associated with the location of the object data in the client buffer 122, e.g., an address associated with the client buffer. The put bulk data message may indicate to the server 408 that the client 402 is ready to send bulk data from the given offset and size. The put bulk data message may advertise the client buffer 122 to the server network device 406 without exposing the client buffer addresses to the server 408, which can be used by the server 408 to respond with read bulk data requests to fill the server buffer 126 with the RDMA operations. In some embodiments, the client buffer information may be advertised to the server network device 406 in the unsolicited message 418 instead of the put bulk data message to perform object transfers using non-RDMA reads.

As shown in FIG. 4, the client 402 may send a request to transfer a first chunk of the object data from the client buffer 122 using a put bulk data message 428 having a sequence ID as 1. In some embodiments, the request from the client 402 may include client buffer information which can be used to transfer a portion of the object data from the client buffer 122 to the server 408 using RDMA operations. In some implementations, the client buffer information may include SGL with physical address segments, which can be provided via the descriptor for each of the put bulk data operations.

The client network device 404 may receive each request to put bulk data via the SQ. The client network device 404 may send the put bulk data descriptor for the put bulk data message 428 along with the sequence ID to the server network device 406 as a network packet 430 over the network 106. The server network device 406 may generate a client request ID based on the request, and associate the client request ID with the client buffer information. The server network device 406 may forward the client request ID, the size of the object, and the sequence ID to the server 408 in a message 432. The server 408 may allocate local memory for placing the object data, e.g., in the server buffer 126.

In some embodiments, when the server 408 receives the request to read a portion of the object data from the client 402, the server 408 can send a plurality of read bulk data messages to read a plurality of chunks corresponding to the portion of the object data. For example, the client buffer 122 can be of 128 KB in size, and each read chunk can be 32 KB in size. As shown in FIG. 4, the server 408 may send a first read chunk request using a read bulk data message 434 to the server network device 406 comprising the information about reading the first chunk from the client buffer 122 and storing it into the server buffer 126. For example, the server 408 may provide an offset for reading the given chunk from the client buffer 122, and information about storing the read chunk into the server buffer 126.

The server network device 406 may allocate a tag for the object transfer request, which can be used for the DDP of the object data into the server buffer 126 using RDMA read operations. The server network device 406 may send a first RDMA read request to the client network device 404 as a network packet 436 based on the read bulk data message 434. The first RDMA read request may also include the corresponding tag for the DDP of the RDMA data into the server buffer 126, the buffer offset, the client buffer ID, and the sequence ID. For example, the client network device 404 may read the first chunk of the object data from a first offset in the client buffer 122 and provide RDMA read responses 438a, 438b, 438c, 438d by splitting the first chunk into multiple packets according to the MTU supported by the network 106. As an example, the client network device 404 may split each 32 KB read chunk into 4 packets of size 8 KB each.

The server network device 406 may manage a server buffer scoreboard 440, which can be used to accumulate RDMA read responses performed over the network 106 in response to the RDMA read request. The server network device 406 may receive multi-packet RDMA read responses 438a-438d and fill the server buffer 126 as indicated by commands 442a, 442b, 442c, 442d. Since the object data portion to be transferred into the server buffer 126 may be bigger in size than the chunk size, multiple read chunks requests can be sent to transfer each portion of the object data via corresponding RDMA operations.

When the server buffer scoreboard 440 is filled indicating that all the packets corresponding to the first read chunk has been received by the server network device 406, the server network device 406 may send a corresponding first read chunk completion message 446 to the server 408 via the CQ. When the server 408 receives a read chunk completion message for a read chunk request, it can free up and recycle the resources associated with that chunk. The server 408 may send multiple such read chunk requests in parallel to the server network device 406, which may further transmit corresponding RDMA read requests to the client network device 406 over the network 106 for reading the chunks of the object data from the client buffer 122 for transferring to the server buffer 126 using RDMA operations. For example, as shown in FIG. 4, the server may send a second read chunk request using a read bulk data message 448, and a $K^{th}$ read chunk request using a read bulk data message 450 to the server network device 406. The server network device 406 may send a $K^{th}$ RDMA read request to the client network device 404 as a network packet 452 based on the read bulk data message 450. When the server buffer scoreboard 440 is filled indicating that all the packets corresponding to the $K^{th}$ read chunk has been received by the server network device 406, the server network device 406 may send a $K^{th}$ read chunk completion message 454 to the server 408 via the CQ.

When the client network device 404 is done with the RDMA transfers to the server buffer 126 corresponding to the $K^{th}$ chunk it may indicate that the portion of the object data corresponding to the first put bulk data message 428 has been read from the client buffer 122, and the client network device 404 may send a completion message 456 including the first sequence ID to the client 402 indicating that the put object command for the first sequence ID has been completed. Thus, the embodiments can accelerate object transfers using zero copy that can allow writing the object data directly into the host memory buffer bypassing the OS kernel in the network stack.

In some cases, multiple put bulk data messages can be sent in parallel or over time to the server 408. Each put bulk data message can include a respective sequence ID, which can be included in the respective completion message received from the client network device 404 as each put bulk data message is processed. As shown in FIG. 4, the client 402 can send a request to transfer a second portion of the object data using a put bulk data message 458 with a second sequence ID, and a request to transfer an $N^{th}$ portion of the object data using a put bulk data message 460 with an $N^{th}$ sequence ID. The client network device 404 may send a completion message 462 with the $N^{th}$ sequence ID corresponding to the put bulk data message 460.

Once the server 408 is done receiving the object data from the client 402, the sever 408 may send an object status message 464 to the server network device 406 comprising the consumed size. The server network device 406 may forward the object status message with the total object size to the client network device 404 as a network packet 466 over the network 106. The client network device 404 may report the status of the put command and the total object size in a message 468 to the client 402.

Figure 5:
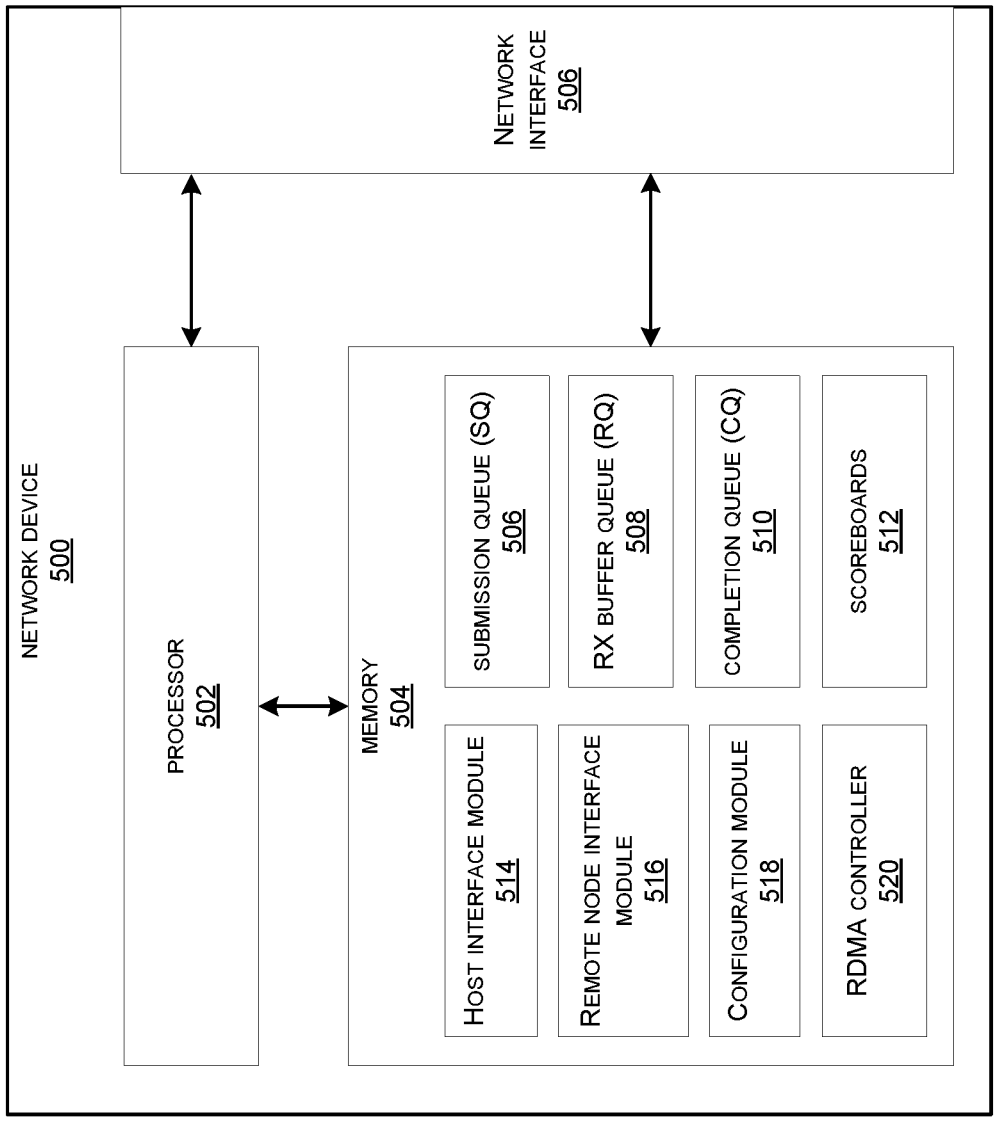
FIG. 5 illustrates example components of a network device, in accordance with some embodiments.

FIG. 5 illustrates example components of a network device 500, in accordance with some embodiments. The network device 500 can be an example of the client network device 112 and the server network device 118 in FIG. 1, the client network device 204 and the sever network device 206 in FIG. 2, the client network device 304 and the sever network device 306 in FIG. 3, and the client network device 404 and the sever network device 406 in FIG. 4.

The network device 500 can include a processor 502, memory 504, and a network interface 506. The processor 502 may be configured to execute instructions that may be stored in the memory 504. The memory 504 may include a submission queue (SQ) 506, an RX buffer queue (RQ) 508, a completion queue (CQ) 510, scoreboards 512, a host interface module 514, a remote node interface module 516, a configuration module 518, and an RDMA controller 520.

The network interface 506 may include physical ports, transceivers, media access control (MAC), and any other suitable components and/or functionality to provide a network interface for communication over a network. The network interface 506 can be used to provide a network interface to the client host device 102 and to the server host device 104 to communicate over the network 106 using a suitable network protocol. In some embodiments, the network interface 506 can support SRD transport protocol for communication over the network 106.

The SQ 506 may be used to submit operations to be executed by the network device 500. For example, the operations may include create command slot, send unsolicited message, get bulk data, put bulk data, write bulk data, read bulk data, or other device level primitive operations. In some implementations, the operations may include respective descriptors to enable the acceleration of object transfers. The RQ 508 may be used for pre-posting anonymous RX buffers for storing data associated with the unsolicited messages. The data associated with the unsolicited messages may include metadata associated with the object transfer commands, and/or the advertised client buffer addresses for shorter object transfers. The CQ 510 may be used for sending completion messages or notifications to the respective host for each entry in the SQ 506 and the RQ 508. In some implementations, the SQ 506, RQ 508, and the CQ 510 may be mapped in the host memory space.

The scoreboards 512 may include a plurality of scoreboards that can be used by the network device 500 to keep scores of certain operations. For example, the scoreboards 512 may include the client buffer scoreboard 342 that can be used to accumulate RDMA writes received from the server network device 306, the server write chunk ack scoreboard 340 that can be used to accumulate acks received in response to the multi-packet RDMA writes, the server buffer scoreboard 440 that can be used to accumulate RDMA write operations performed in response to the RDMA read requests, and any other scoreboards that may be used by the network device 500 to enable the object data transfer. The scoreboards 512 can be implemented using any suitable data structure.

The host interface module 514 may be configured to provide an interface to communicate with the host. For example, the host can be software executing on the processor in the host device, e.g., a host driver or an SDK. For example, for the client network device 112, the host interface module 514 may provide an interface to the client host application 120. For the server network device 118, the host interface module 514 may provide an interface to the server host application 124. In various embodiments, the host interface module 514 may be used to receive various request messages or commands from the host (e.g., create command slot, unsolicited message, put bulk data, get bulk data, write bulk data, read bulk data, etc.) and send various completion messages or status messages to the host. In some examples, the host interface module 514 may also be used to generate a client request ID, and associate the client request ID with the client buffer information. The client request ID can be any opaque ID that corresponds to the client buffer address used for the object transfer, and can prevent exposing the client buffer address to the server host application 124. In some embodiments, the host interface module 514 may be used to manage the SQ 506 and the CQ 510.

The remote node interface module 516 may be configured to provide an interface to communicate with a remote node over a network using a suitable transport protocol. In some embodiments, the remote node interface module 516 may provide an interface to communicate with the remote node using the SRD transport protocol. For example, the remote node interface module 516 in the client network device 112 may be configured to provide an interface to communicate with the server network device 118, and the remote node interface module 516 in the server network device 118 may be configured to provide an interface to communicate with the client network device 112. In some examples, the remote node interface module 516 can provide appropriate headers to generate network packets for transmitting over the network 106 using any suitable transport protocol, as well as perform encryption/compression or other crypto functions on the packets before transmission. In some examples, the remote node interface module 516 can receive network packets via the network 106, and parse the packets to recover the original data/message. In some embodiments, the remote node interface module 516 may be used to manage the RQ 508.

The configuration module 518 can be used for various configuration, allocation, or initialization tasks performed by the network devices such as command slot configuration, resource allocation, network connection allocation, DDP configuration, tag allocation, scoreboards initialization, etc.

The RDMA controller 520 may be configured to facilitate RDMA writes and reads with the remote nodes via the remote node interface module 516. In some embodiments, the RDMA controller 520 may split up the data chunks into multiple packets based on the MTU of the network 106 for transmission over the network 106. The RDMA controller 520 may also be configured to manage the client buffer scoreboard 342, the server write chunk ack scoreboard 340, and the server buffer scoreboard 440.

Figure 6:
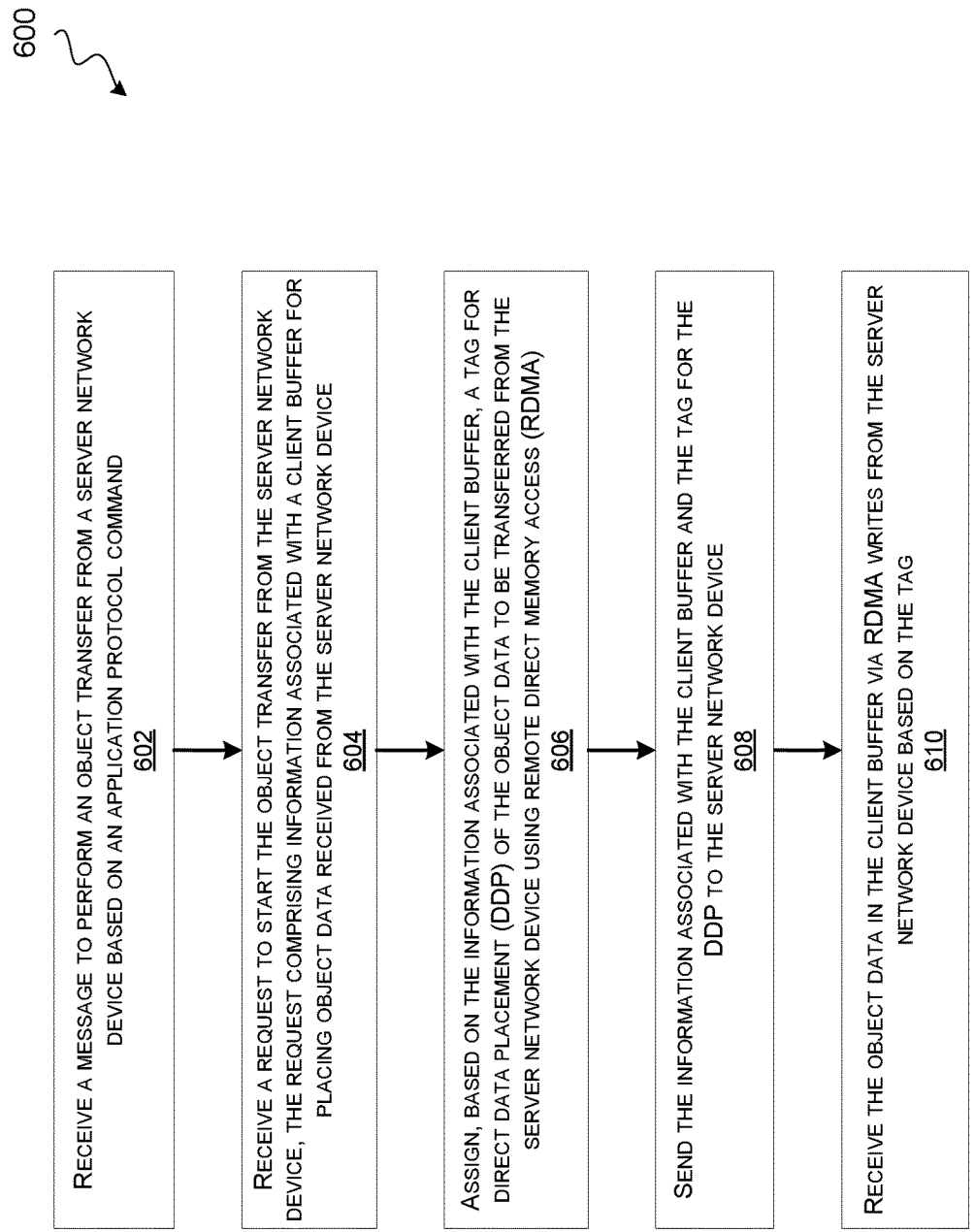
FIG. 6 illustrates an example flowchart for a method executed by a network device, in accordance with some embodiments.

FIG. 6 illustrates an example flowchart 600 for a method executed by a client network device, in accordance with some embodiments. As an example, the method may be executed by any of the client network device 112, client network device 202, the client network device 302, the client network device 402, or the network device 500.

In step 602, the method includes receiving a message to perform an object transfer from a server network device based on an application protocol command. As discussed with reference to FIG. 3, the client network device 304 may receive the unsolicited message 318 to perform an object transfer from the server network device 306 based on the HTTP/HTTPS protocol object GET command. The unsolicited message 318 may be received in the SQ 506 via the host interface module 514. In some examples, the client network device 304 may perform the object transfer with the server 308 via the server network device 306 using the SRD transport protocol. The object transfer may be performed using a command slot as discussed with reference to create command slot messages 310 and 312.

In step 604, the method includes receiving a request to start the object transfer from the server network device. The request may comprise information associated with a client buffer (e.g., client buffer address) for placing object data received from the server network device. The client network device 304 may receive the request to start the object transfer based on the get bulk data message 328 received from the client 302 via the SQ 506. The request from the client 302 may also include a requested data range of the object data that corresponds to an offset in the server buffer 126 where the object data is stored (e.g., object offset).

In step 606, the method includes assigning, based on the information associated with the client buffer, a tag for DDP of the object data to be transferred from the server network device using RDMA. The client network device 304 may assign a tag for the given client buffer, which can be used by the server network device 306 for the DDP of the object data to be transferred from the server network device 306 using RDMA writes into the client buffer 122. The tag may be assigned by the configuration module 518.

In step 608, the method includes sending the information associated with the client buffer and the tag for the DDP to the server network device. The client network device 304 may send the get bulk data descriptor for the get bulk data message 328 comprising the buffer information, the object offset, and the tag to the server network device 306 as the network packet 330. The network packet 330 may be sent by the remote node interface module 516 via the network interface 506. The buffer information, the object offset, and the tag may be received by the server network device 306. The host interface module 514 in the server network device 306 may be used to generate a client request ID, and forward the client request ID and the object offset to the server host application 124 based on the request.

In step 610, the method includes receiving the object data in the client buffer via RDMA writes from the server network device based on the tag. The client network device 304 may receive multiple packets belonging to the first write chunk via the RDMA writes 336a-336d from the sever network device 306. The server network device 306 may use the tag to perform the RDMA write operations. The RDMA writes may be managed by the RDMA controller 520. The client network device 304 may fill the client buffer 122 with each RDMA write using the host interface module 514. In some instances, the client buffer 122 may be bigger in size than the size of each write chunk, and, therefore, only portion of the client buffer 122 may be filled at a time. In such cases, multiple get bulk data operations may be performed to fill the client buffer 122 with different portions of the object data.

The method may further include receiving another message to perform the object transfer to the server network device based on another application protocol command. As discussed with reference to FIG. 4, the client network device 404 may receive the unsolicited message 418 to perform the object transfer to the server network device 406 based on the HTTP/HTTPS protocol object PUT command. In some examples, a different command slot may be created as discussed with reference to create command slot messages 410 and 412 before starting this object transfer.

The method may further include receiving another request to send the object data to the server network device. The other request may comprise information associated with the client buffer where the object data is stored and a size of the object data. The client network device 404 may receive the other request to send the object data to the server network device 406 based on the put bulk data message 428 received from the client 402 via the SQ 506. For example, the other request from the client 402 may include an address of the client buffer 122 where the portion of the object data is stored and the size of the portion of the object data.

The method may further include sending the information associated with the client buffer and the size of the object data to the server network device. The client network device 404 may send the put bulk data descriptor for the put bulk data message 428 comprising the buffer information and the size of the object data to the server network device 406 as the network packet 430. The network packet 430 may be sent by the remote node interface module 516 via the network interface 506. The buffer information and the size of the object data may be received by the server network device 406. The host interface module 514 in the server network device 406 may generate a second client request ID, and forward the second client request ID and the size of the object data to the server host application 124. The server host application 124 may allocate a portion of the server buffer 126 for placing the object data. The server network device 406 may assign another tag for the DDP of the object data to be transferred from the client buffer 122 to the server buffer 126 using the RDMA reads.

The method may further include receiving an RDMA read request from the server network device to perform RDMA reads from the client buffer. The RDMA read request may include the other tag and the address information associated with the server buffer 126 for placing the object data received via the RDMA reads. The client network device 404 may receive the first RDMA read request as the network packet 436 based on the read bulk data message 434.

The method may further include sending the object data to the server network device via the RDMA reads in response to the RDMA read request based on the other tag. The client network device 404 may read a first chunk of the object data from the client buffer 122 and provide RDMA read responses 438a-438d by splitting the first chunk into multiple packets. The server network device 406 may receive multi-packet RDMA read responses 438a-438d and fill the server buffer 126 with the first chunk. In some cases, the client network device 404 may receive multiple put bulk data messages to transfer different portions of the object data to the server. Thus, the embodiments can accelerate object transfers using zero copy that can allow writing the object data directly into the host memory buffer bypassing the OS kernel in the network stack.

Figure 7:
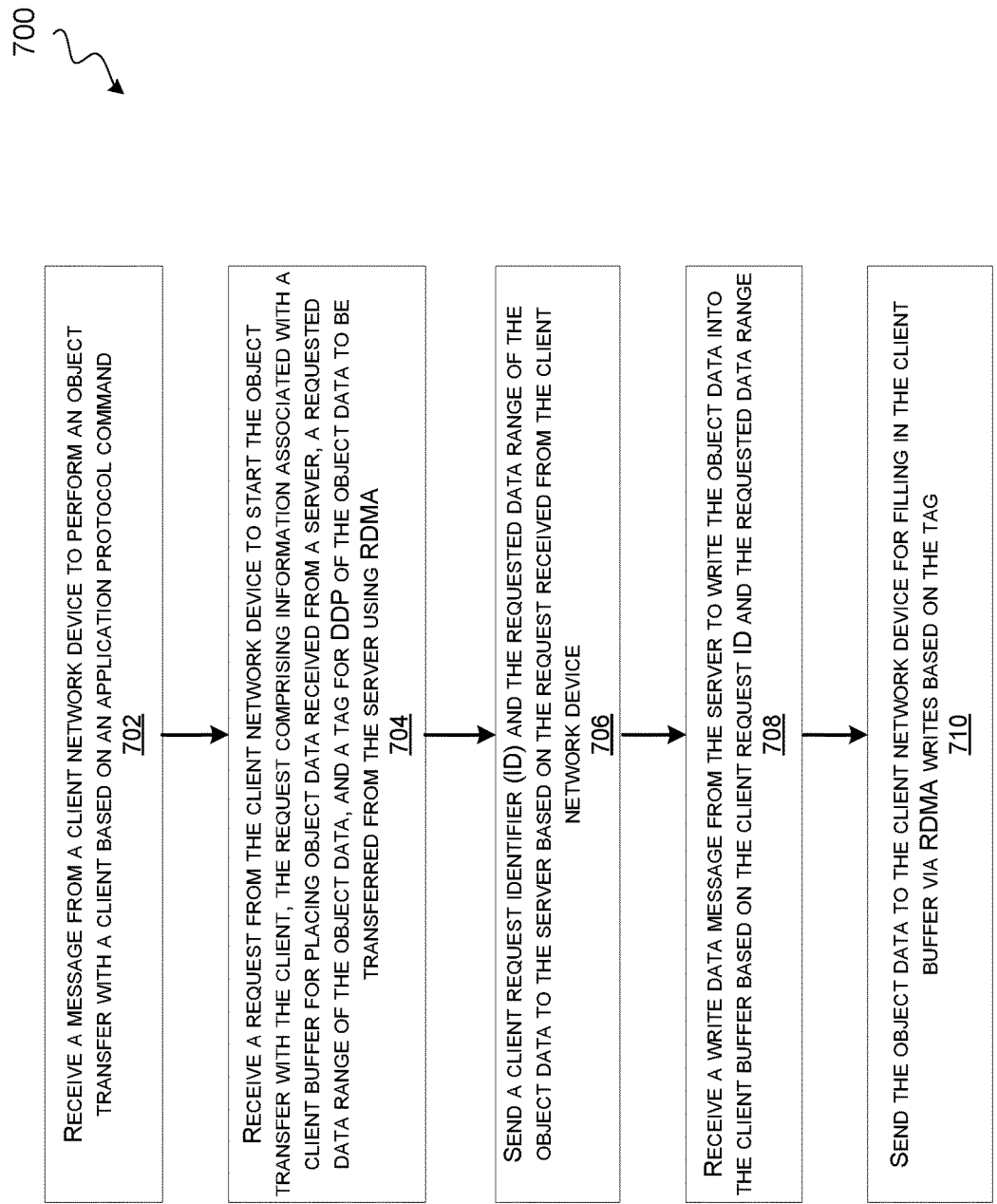
FIG. 7 illustrates an example flowchart for a method executed by a server network device, in accordance with some embodiments.

FIG. 7 illustrates an example flowchart 700 for a method executed by a server network device, in accordance with some embodiments. As an example, the method may be executed by any of the server network device 118, server network device 206, the server network device 306, the server network device 406, or the network device 500.

In step 702, the method includes receiving a message from a client network device to perform an object transfer with a client based on an application protocol command. As discussed with reference to FIG. 3, the server network device 306 may receive the unsolicited message from the client network device 304 in the network packet 320 to perform an object transfer with the client 302 based on the HTTP/HTTPS protocol object GET command. The unsolicited message may be received in the SQ 506 via the host interface module 514. In some examples, the server network device 304 may perform the object transfer with the client 302 via the client network device 304 using the SRD transport protocol. The object transfer may be performed using a command slot as discussed with reference to create command slot messages 310 and 312.

In step 704, the method includes receiving a request from the client network device to start the object transfer with the client. The request may comprise information associated with a client buffer for placing object data received from a server, a requested data range of the object data, and a tag assigned by the client network device 304 for the DDP of the object data to be transferred from the server using RDMA. The server network device 306 may receive the network packet 330 with the request to start the object transfer with the client based on the get bulk data message 328. The request from the client 302 may include an address associated with the client buffer 122 and the requested data range of the object data, which can be used to fill the client buffer 122 with the portion of the object data read from the server 308.

In step 706, the method includes sending a client request ID and the requested data range of the object data to the server based on the request received from the client network device. The server network device 306 may forward the client request ID and the requested data range of the object data to the server 308 in a message 332 without sending the tag. The server network device 306 may use the tag for the RDMA operations. The tag may be assigned by the configuration module 518.

In step 708, the method includes receiving a write data message from the server to write the object data into the client buffer based on the client request ID and the requested data range. The server network device 304 may receive the write bulk data message 334 from the server host application 124 comprising the address information associated with the server buffer 126 where the object data is stored.

In step 710, the method includes sending the object data to the client network device for filling in the client buffer via RDMA writes based on the tag. The server network device 306 may send the object data to the client network device 304 for filling in the client buffer 122 via a plurality of RDMA writes 336a-336d based on the tag.

The method may further include receiving another message from the client network device to perform the object transfer with the client based on another application protocol command. As discussed with reference to FIG. 4, the server network device 406 may receive another unsolicited message in the network packet 420 to perform the object transfer with the client 402 based on the HTTP/HTTPS protocol object PUT command.

The method may further include receiving another request from the client network device 402 to send the object data to the server 408. The request may comprise information associated with the client buffer 122 where the object data is stored, and a size of the object data. The method may further include sending a second client request ID and the size of the object data to the server host application 124. The server host application 124 may allocate a portion of the server buffer 126 for placing the object data. The method may further include assigning a tag by the server network device 304 for the DDP of the object data to be transferred from the client buffer 122 to the allocated portion of the server buffer 126 using the RDMA reads.

The method may further include sending an RDMA read request to the client network device 404 by the server network device 304 to perform the RDMA reads from the client buffer 122. The RDMA read request may include the tag and the address information associated with the portion of the server buffer 126 for placing the object data received via the RDMA reads. The method may further include receiving the object data from the client buffer 122 via the RDMA reads in response to the RDMA read request based on the tag.

Various embodiments disclose a network device that can provide a unified interface to an application executing on a host device (e.g., host driver/SDK) which can utilize the capabilities of the network device to enable acceleration of different higher level object transfer commands (e.g., HTTP/HTTPS object GET/PUT). The network device can further accelerate the object transfer commands by utilizing the SRD transport protocol to overcome TCP shortcomings. Some embodiments can provide the client buffer information via abstract commands to the server host application without exposing the client memory addresses, which can allow optimizations for very short GET/PUT object commands that do not need to use RDMA.

Figure 8:
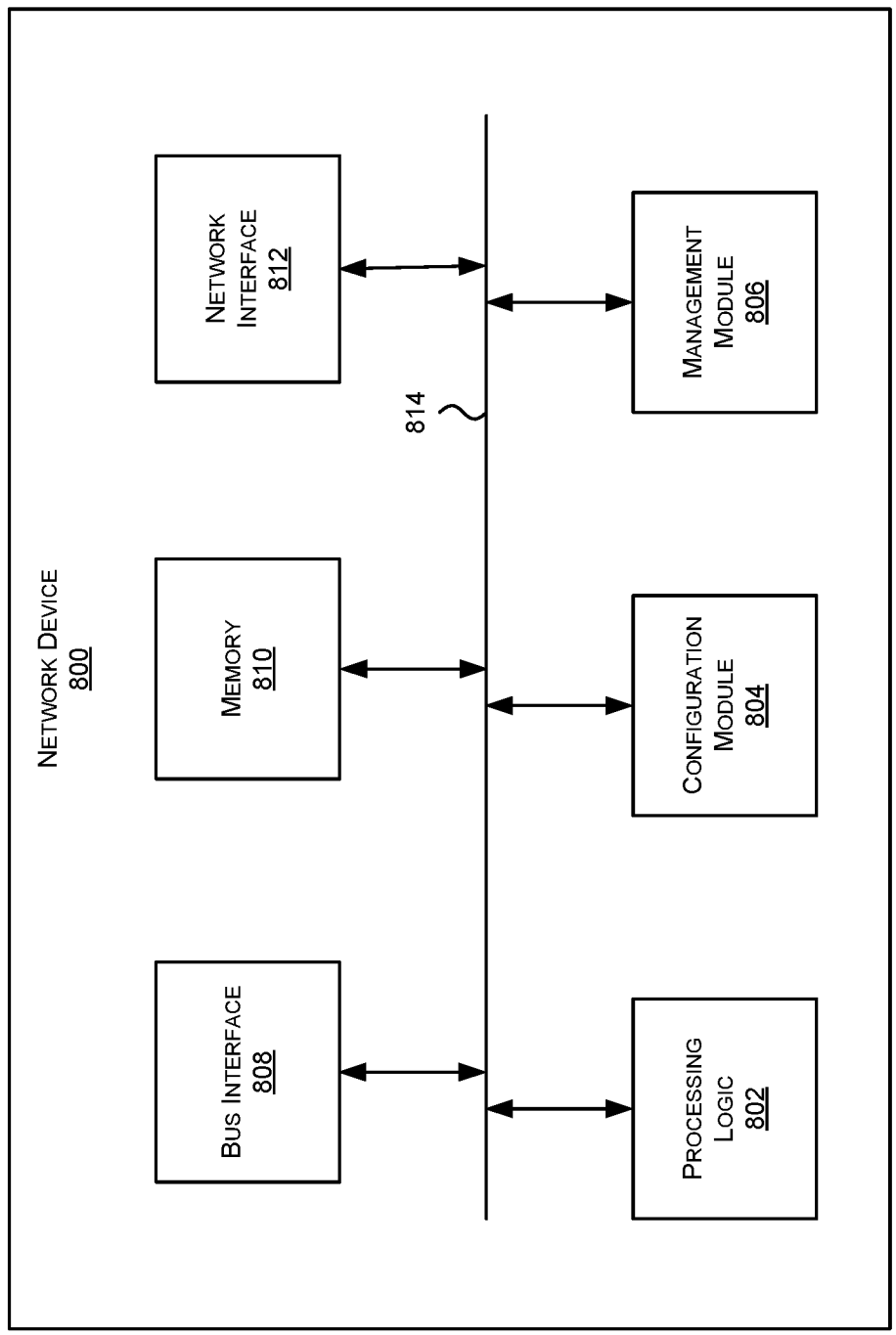
FIG. 8 illustrates an example of a network device, according to certain aspects of the disclosure.

FIG. 8 illustrates an example of a network device 800. Functionality and/or several components of the network device 800 may be used without limitation with other embodiments disclosed elsewhere in this disclosure, without limitations. In some examples, the network device 800 can be a client network device or a server network device, as described with reference to previous figures. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 8. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 9:
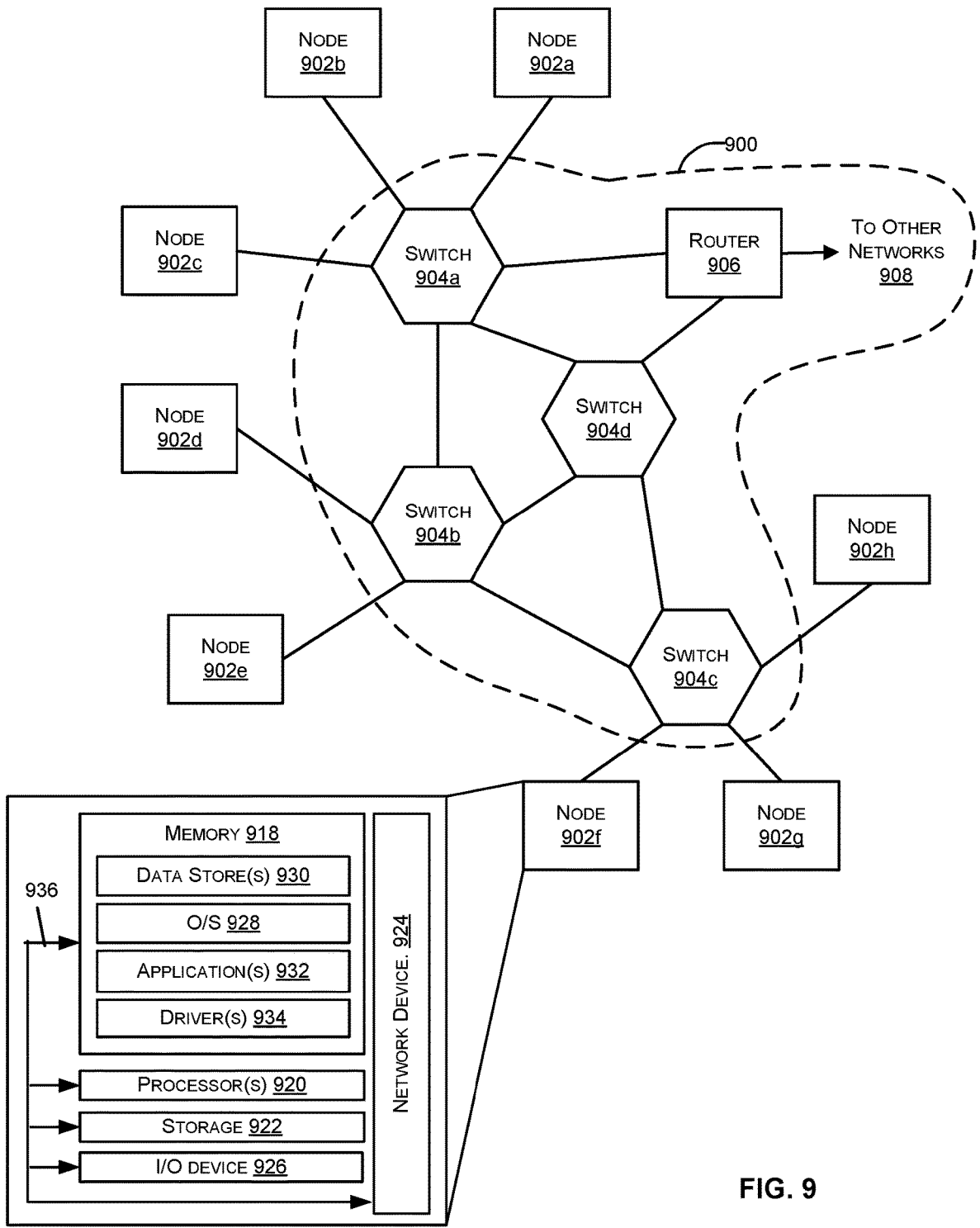
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices 800 of FIG. 8, such as nodes comprising the network device, switches and routers.

In certain embodiments, the network 900 may be based on a switched architecture with point-to-point links. As illustrated in FIG. 9, the network 900 includes a plurality of switches 904*a*-904*d*, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904*a*-904*d* may be connected to a plurality of nodes 902*a*-902*h* and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904*a*-904*d* and router 906, if present, may be referred to as a switch fabric, a fabric, a network fabric, or simply a network. In the context of a computer network, terms "fabric" and "network" may be used interchangeably herein.

Nodes 902*a*-902*h* may be any combination of host systems, processor nodes, storage subsystems, and I/O chassis that represent user devices, service provider computers or third party computers. In some examples, the client host device 102 or the server host device 104 can be one of the nodes 902*a*-902*h*.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method performed by a client network device, comprising:
   receiving, via a submission queue (SQ), a create command slot request from a client host application executing on a client host device to create a command slot to perform an object transfer with a server host device;
   creating the command slot by allocating resources to perform the object transfer, wherein allocating the resources includes establishing a transport protocol connection with a server network device of the server host device;
   receiving, via the SQ, a first unsolicited message to perform the object transfer based on a first application protocol command to get object data from the server host device;
   configuring the command slot to perform cryptographic operations on the object data;
   receiving, via the SQ, a first request to get a first portion of the object data from the server host device, the first request comprising address information associated with a client buffer for placing the first portion of the object data, an object offset, and a first sequence identifier (ID);
   assigning a first tag corresponding to the address information associated with the client buffer for direct data placement (DDP) of the first portion of the object data to be transferred from the server host device using remote direct memory access (RDMA);
   sending the address information associated with the client buffer, the object offset, the first sequence ID, and the first tag to the server network device using the transport protocol connection, wherein the server network device forwards a client request ID, the object offset, and the first sequence ID to a server host application executing on the server host device, and wherein the server host application sends a message to the server network device to send the first portion of the object data to the client network device based on the object offset and the client request ID, the message comprising a local memory address of the server host device where the object data is stored;
   receiving the first portion of the object data via a plurality of RDMA writes performed by the server network device based on the message received from the server host application; and
   performing the DDP of the received first portion of the object data into the client buffer using the first tag.

2. The method of claim 1, further comprising:
   receiving, via the SQ, a second unsolicited message to perform the object transfer based on a second application protocol command to send the object data to the server host device;
   receiving, via the SQ, a second request to send a second portion of the object data from the client buffer to the server host device, the second request comprising address information associated with the client buffer where the second portion of the object data is stored, a size of the second portion, and a second sequence ID;
   sending the address information associated with the client buffer, the size of the second portion, and the second sequence ID to the server network device using the transport protocol connection, wherein the server network device sends a client request ID, the size of the second portion, and the second sequence ID to the server host application, wherein the server host application allocates local memory in the server host device for placing the object data;
   receiving an RDMA read request from the server network device to perform RDMA reads from the client buffer, wherein the RDMA read request includes a second tag assigned by the server network device for the DDP of the second portion of the object data to be transferred from the client buffer to the local memory in the server host device using the RDMA reads, and address information associated with the local memory in the server host device for placing the second portion of the object data received via the RDMA reads;
   receiving the second portion of the object data from the client buffer in response to the RDMA read request; and
   sending the second portion of the object data to the server host device for storing in the local memory.

3. The method of claim 1, wherein the first portion of the object data is received as multiple packets based on the transport protocol connection.

4. The method of claim 2, wherein contents of the first unsolicited message and the second unsolicited message are stored in receive (RX) buffers in the server host device that are pre-posted by the client host application in an RX queue (RQ) in the server network device.

5. A method performed by a client network device, comprising:
   receiving a message to perform an object transfer from a server network device based on an application protocol command;
   receiving a request to start the object transfer from the server network device, the request comprising information associated with a client buffer for placing object data received from the server network device;
   assigning, based on the information associated with the client buffer, a tag for direct data placement (DDP) of the object data to be transferred from the server network device using remote direct memory access (RDMA);
   sending the information associated with the client buffer and the tag for the DDP to the server network device;
   receiving the object data in the client buffer via RDMA writes from the server network device based on the tag; and sending a completion message to a client host application indicating that the object transfer has completed when a client buffer scoreboard that accumulates completion of the RDMA writes is full.

6. The method of claim 5, wherein the server network device sends a client request identifier (ID) and a requested data range for the object data to a server host application of a server based on the request.

7. The method of claim 6, wherein the server network device receives a message from the server host application to send the object data to the client network device based on the requested data range of the object data and the client request ID, the message from the server host application comprising location information associated with a local memory of the server where the object data is stored.

8. The method of claim 7, wherein the information associated with the client buffer includes a client buffer address, and the client request ID corresponds to the client buffer address, and wherein the requested data range corresponds to an offset in the local memory of the server where the object data is stored.

9. The method of claim 5, further comprising:
prior to receiving the message to perform the object transfer from the server network device, receiving a request to create a command slot to be used for performing the object transfer from the server network device;
creating the command slot by allocating a command slot identifier; and
configuring the command slot to perform cryptographic operations on the object data.

10. The method of claim 5, wherein the application protocol command is an object GET command.

11. The method of claim 5, further comprising:
receiving another message to perform the object transfer to the server network device based on another application protocol command;
receiving another request to send the object data to the server network device, the other request comprising information associated with the client buffer where the object data is stored and a size of the object data;
sending the information associated with the client buffer and the size of the object data to the server network device, wherein the server network device sends a second client request ID and the size of the object data to a server host application of a server, and wherein the server host application allocates local memory in the server for placing the object data;
receiving an RDMA read request from the server network device to perform RDMA reads from the client buffer, wherein the RDMA request includes another tag assigned by the server network device for the DDP of the object data to be transferred from the client buffer to the server using the RDMA reads; and
sending the object data to the server via the RDMA reads in response to the RDMA read request based on the other tag.

12. The method of claim 11, wherein the RDMA read request from the server network device includes address information associated with the local memory in the server for placing the object data received via the RDMA reads.

13. The method of claim 11, wherein the other application protocol command is an object PUT command.

14. The method of claim 5, wherein the object transfer with the server network device is performed using a Scalable Reliable Datagram (SRD) transport protocol.

15. A client network device configured to:
receive, via a submission queue (SQ), a message to perform an object transfer from a server network device based on an application protocol command;
receive, via the SQ, a request to start the object transfer from the server network device, the request comprising information associated with a client buffer for placing object data received from the server network device;
assign, based on the information associated with the client buffer, a tag for DDP of the object data to be transferred from the server network device using RDMA;
send the information associated with the client buffer and the tag for the DDP to the server network device;
receive the object data in the client buffer via RDMA writes from the server network device based on the tag; and
send a completion message to a client host application indicating that the object transfer has completed when a client buffer scoreboard that accumulates completion of the RDMA writes is full.

16. The client network device of claim 15, wherein the message to perform the object transfer and the request to start the object transfer from the server network device are received from a client host application executing on a client host device that comprises the client network device.

17. The client network device of claim 15, wherein the server network device sends a client request ID and a requested data range for the object data to a server host application of a server based on the request, and wherein the server network device receives a message from the server host application to send the object data to the client network device based on the requested data range of the object data and the client request ID.

18. The client network device of claim 15, wherein the request to start the object transfer from the server network device corresponds to a portion of the object data, and wherein the client network device is further configured to receive a plurality of requests to start the object transfer from the server network device corresponding to different portions of the object data.

19. The client network device of claim 18, wherein each request in the plurality of requests is associated with a sequence identifier.

20. A method performed by a server network device, comprising:
prior to receiving a message from a client network device to perform an object transfer with a client, receiving a request to create a command slot to be used for performing the object transfer with the client;
creating the command slot by allocating a command slot identifier;
configuring the command slot to perform cryptographic operations on object data of the object transfer;
receiving the message from the client network device to perform the object transfer with the client based on an application protocol command;
receiving a request from the client network device to start the object transfer with the client, the request comprising information associated with a client buffer for placing the object data received from a server, a requested data range of the object data, and a tag for direct data placement (DDP) of the object data to be transferred from the server using remote direct memory access (RDMA);
sending a client request identifier (ID) and the requested data range of the object data to the server based on the request received from the client network device;

receiving a write data message from the server to write the object data into the client buffer based on the client request ID and the requested data range, the write data message comprising address information associated with a local memory in the server where the object data is stored; and sending the object data to the client network device for filling in the client buffer via RDMA writes based on the tag.

21. The method of claim 20, further comprising:

receiving another message from the client network device to perform the object transfer with the client based on another application protocol command;

receiving another request from the client network device to send the object data to the server, the other request comprising information associated with the client buffer where the object data is stored, and a size of the object data;

sending a second client request identifier (ID) and the size of the object data to a server host application of the server, wherein the server host application allocates local memory in the server for placing the object data;

assigning a tag for the DDP of the object data to be transferred from the client buffer to the local memory in the server using RDMA reads;

sending an RDMA read request to the client network device to perform the RDMA reads from the client buffer, the RDMA read request comprising the tag and address information associated with the local memory in the server for placing the object data received via the RDMA reads; and receiving the object data from the client buffer via the RDMA reads in response to the RDMA read request based on the tag.

\* \* \* \* \*